United States Patent [19]

Bassetti

[11] 4,299,500
[45] Nov. 10, 1981

[54] APPARATUS FOR STORING AND STIRRING VISCOUS LIQUIDS CONTAINED IN CANS

[75] Inventor: Aldo Bassetti, Milan, Italy

[73] Assignee: Miscelatori Dosatori Elettronica MIDEL s.r.l., Italy

[21] Appl. No.: 106,537

[22] Filed: Dec. 26, 1979

[30] Foreign Application Priority Data

Dec. 28, 1978 [IT] Italy ............................. 31394 A/78

[51] Int. Cl.³ .............................................. B01F 7/16
[52] U.S. Cl. .................................... 366/198; 366/206; 366/605
[58] Field of Search ............... 366/197, 198, 206, 207, 366/241, 297, 605

[56] References Cited

U.S. PATENT DOCUMENTS

| | | | |
|---|---|---|---|
| 2,333,951 | 11/1943 | O'Neill | 366/605 X |
| 2,423,969 | 7/1947 | Foltz | 366/605 X |
| 2,526,351 | 10/1950 | Grubelic | 366/198 |
| 2,802,649 | 8/1957 | Stockton | 366/197 |
| 2,923,438 | 2/1960 | Logan et al. | 366/605 X |
| 4,042,221 | 8/1977 | Myers et al. | 366/207 X |

Primary Examiner—Philip R. Coe
Attorney, Agent, or Firm—Shlesinger, Fitzsimmons & Shlesinger

[57] ABSTRACT

An apparatus for storing and stirring viscous liquids, particularly paints, contained in cans comprises a rotatable stand provided with circumferentially arranged tiltable trays for housing individual cans. A coupling member is rotatably mounted above each tray, and can be connected with a stirrer rotatably supported in the lid of the can housed in the respective tray.

3 Claims, 6 Drawing Figures

APPARATUS FOR STORING AND STIRRING VISCOUS LIQUIDS CONTAINED IN CANS

This invention relates to an apparatus for storing and stirring viscous liquids, particularly paints, contained in cans.

Paint manufacturers have tended for some time to reduce the number of differently coloured paints in order to limit the number of varieties of paint to be kept in store. A certain limited number of basic colours is therefore sold, and in order to obtain a larger variety of colours of various shades, the paint user mixes together certain selected basic colours in various proportions.

Paints of the most varied colours can be obtained according to the formulation used, i.e. the proportion by weight of the basic colours utilized. Before painting the article, the user has therefore to prepare the correct mixture from the available basic colours.

The problem of reproducing a determined colour becomes particularly acute when repainting part of an object already previously painted.

This is particularly so, for example, when repainting the repaired parts of a vehicle body, where it is extremely important to repaint the repaired part in the same original colour in which the other parts of the body are painted.

Appropriate formulations are therefore available which enable the required colours to be reproduced even after a considerable time, by mixing certain basic colours together in determined weight proportions.

The paints are normally sold in cans, and before mixing the basic colours to give the required colour, the paints must be stirred in their cans to make them perfectly uniform and homogeneous.

Apparatus are available commercially for storing and stirring paints in cans for use by the paint users, such apparatus being normally in the form of a show cabinet with several shelves on which the cans containing the various paints of the basic colours are disposed. These apparatus are provided with a motor-driven stirring mechanism which by means of suitable mechanical transmissions simultaneously rotates the coupling members which are disposed at those positions on the cabinet shelves in which the paint tins are arranged, and can be connected to the stirrers which are rotatably supported in the can lids.

In order to prepare a determined paint according to a certain formulation, the cans containing the basic colours concerned must be taken from the show cabinet in succession, and the required quantity of each basic colour is then poured into another container standing on a balance. Searching for the various cans in their positions on the shelves of the show cabinet, taking them down and then returning them are not only laborious operations, as the cans which are sought can be on any shelf, possibly at a high level, but also result in a considerable time wastage.

The object of the present invention is therefore to provide an apparatus for storing and stirring viscous liquids contained in cans, particularly paints, which is able to make the various cans to be used in preparing a determined mixture available one at a time on specific request in a predetermined working position, without the user having to move from his own position in order to search for the required cans.

This object is attained according to the invention by an apparatus constituted essentially by a stand rotatably mounted on a vertical column and comprising at least one preferably circular shelf, on the periphery of which, and in a plurality of positions, there are disposed trays which can be tilted outwards about horizontal axes and are each arranged to receive a can and are provided with can fixing means, a coupling member being rotatably mounted above each tray and at a determined distance therefrom in a structure overlying the stand, and being arranged to be connected to a stirrer rotatably supported in the lid of the can disposed on the relative tray, said coupling members being kinematically linked together and to a motor disposed on the rotatable stand.

The rotatable stand can be rotated either by hand or, preferably, by a motor in order to bring a determined can into a position corresponding with a working station to the side of the apparatus.

In a preferred embodiment of the apparatus according to the invention, the rotatable stand comprises two or more than two overlying parallel shelves, in which case, with the exception of the highest one, the overlying structures in which the coupling members for driving the stirrers are mounted can be constituted by the base of the relative overlying shelf.

When the rotatable stand comprises more than one shelf, the apparatus advantageously comprises motor-driven lifting means in order to be able to move each shelf to the level at which the working station is situated, and to bring the required can into a position corresponding with the working station by rotating the stand.

The working station is provided with a balance for weighing the required quantities of the various paints to be taken from the respective cans, in accordance with the various formulations. The working station can also be provided in addition with a programmable electronic or electrical control panel for operating the motors which rotate and raise or lower the stand, and which rotate the coupling members for stirring the paints in the cans.

In the case of electronic control, it is possible to automate the operation of the apparatus to the maximum level, with preselection of the various basic colours as required by the respective formulation for preparing a determined mixture, and with suitable controls for the sequence of operating stages and motor drive controls, so as to limit the manual work of the operator to a minimum, such that he can remain permanently in position.

These and other characteristics of the apparatus according to the invention and the advantages deriving therefrom will be more apparent from the description given hereinafter of a non-limiting embodiment thereof, with reference to the accompanying drawings in which.

In the embodiment shown on the drawings, the apparatus according to the invention comprises a turntable or rotatable stand comprising two shelves for receiving a total of 28 cans (14 per shelf) containing paints of different basic colours. A third shelf could normally be provided, as the basic paint colours available commercially are about 40 in number. However, the number of shelves can be chosen according to requirements, and reference will be made hereinafter to the case of two shelves.

The rotatable stand is indicated overall on the drawing by the reference numeral 10. It comprises a central vertical tubular structure 11 to which a series of superposed spaced-apart annular platforms 12, 13, 14 are rigidly fixed. Each of these annular platforms is in the form of an upperly open box stiffened by ribs 15 disposed in ray formation. These stiffening ribs can be dispensed with in the upper platform 14.

Figure 1:
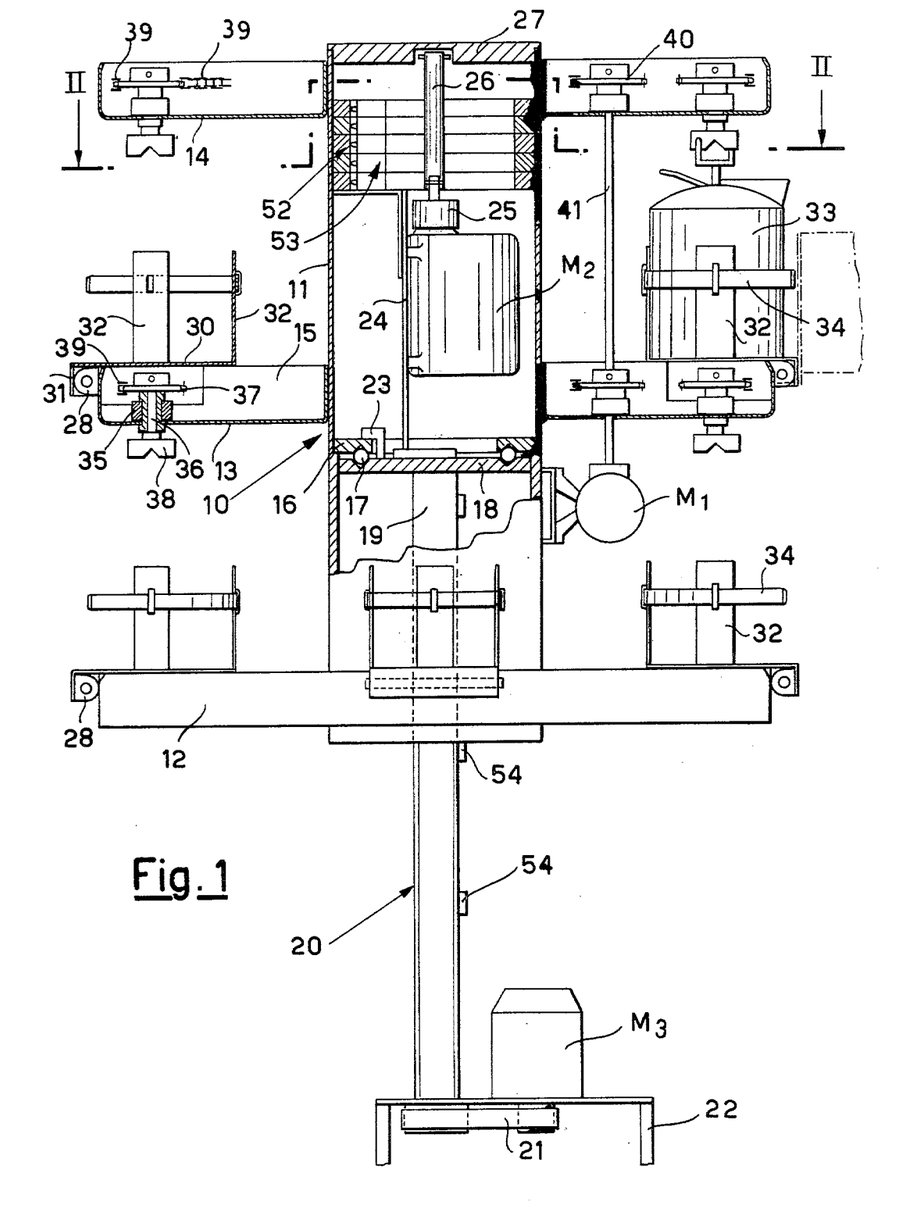
FIG. 1 is a side view of the apparatus in partial vertical section taken on the line I—I of FIG. 2.

At a certain height inside the tubular structure 11, there is provided a ring 16 rigid with the structure wall, said ring 16 resting by way of a thrust ball bearing 17 on a plate 18 disposed at the top of a central column 19 forming part of a mechanical screw lifting device indicated overall by 20 and driven by a transmission 21 connected to an electric motor $M_3$ mounted on a base 22.

Suitable stops 23 rigid with the plate 18 prevent the entire stand 10 from tilting, while enabling it to rotate.

The plate 18 supports a second electric motor $M_2$ inside the tubular structure 11 by way of a support 24, said motor driving, by way of a reduction gear 25, a vertical shaft 26 having its axis coinciding with the axis of the tubular structure 11 and its upper end connected to a disc 27 which upperly closes the tubular structure 11 and is rigid with it.

The motor $M_2$ can thus rotate the entire stand 10 about its vertical axis, and the motor $M_3$ can independently raise or lower the stand.

The two annular platforms 12 and 13 each comprise at their periphery a certain number (14 in the case illustrated) of pairs of brackets 28 which rotatably support spindles 29 (see FIG. 3), each of which carries a projecting tray 30.

Figure 3:
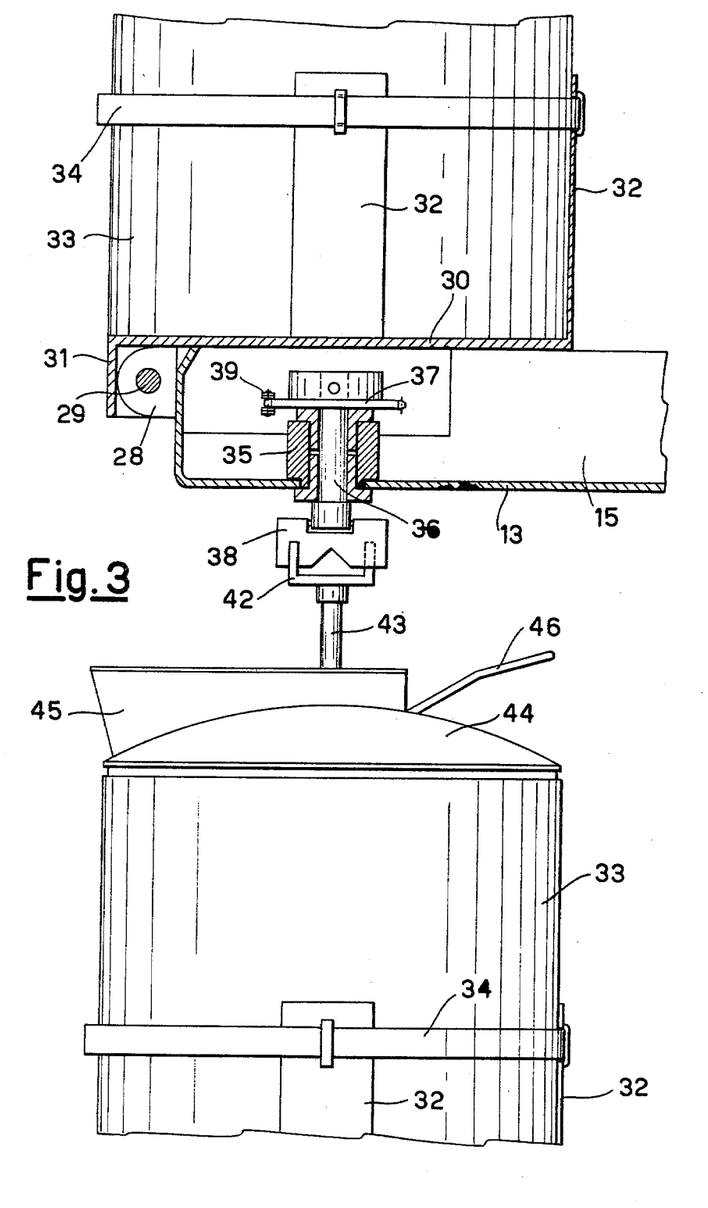
FIG. 3 shows a detail of FIG. 1 to an enlarged scale.

Each tray 30 has its outer edge 31 bent downwards, and three walls 32 disposed at about 90° to each other project upwards. A can 33 can be disposed on each tray 30, and can be firmly locked thereon by a clip 34.

Figure 2:
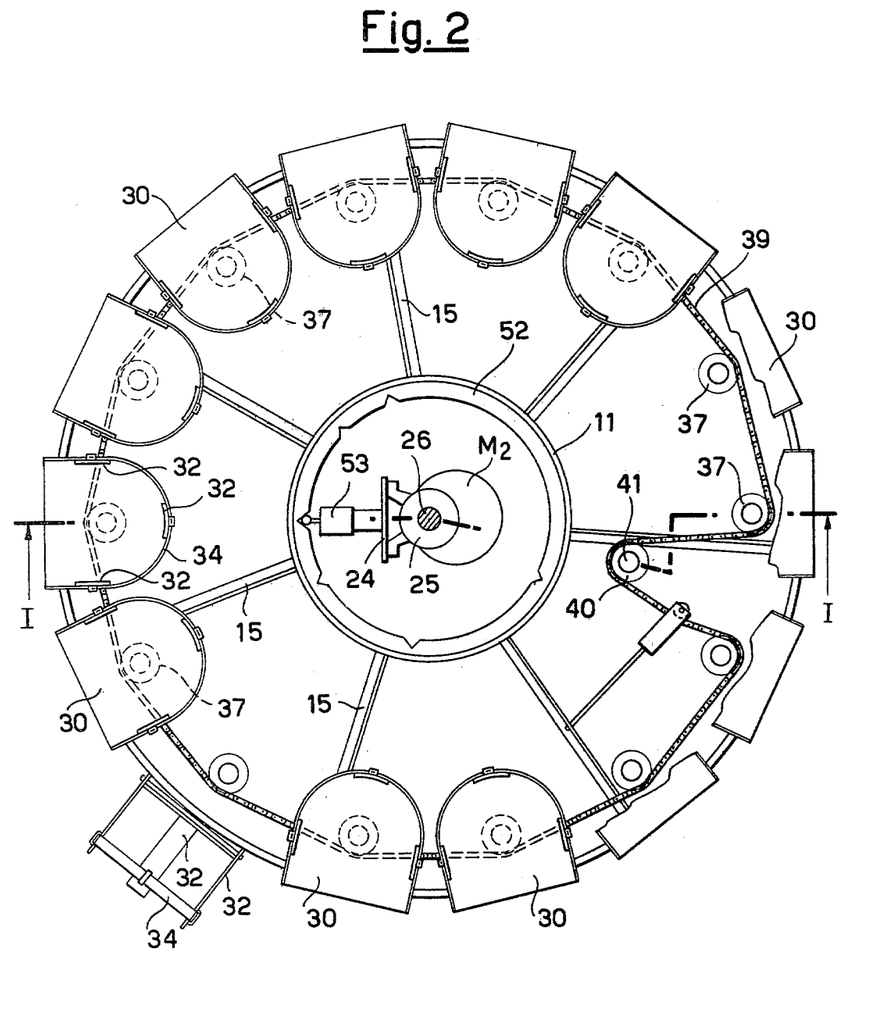
FIG. 2 is a horizontal section on the line II—II of FIG. 1.

In their normal position, the trays 30 are disposed horizontally and rest on the ribs 15 or on suitable supports (not shown) rigid with the base of the platforms 12 and 13. Each tray 30 with its can 33 fixed thereto can be tilted through 90° (see the right hand side of FIG. 1 and the bottom of FIG. 2) so as to move the can into a horizontal position projecting outwards from the platform.

Bushes 35 are mounted on the base of the platforms 13 and 14, their vertical axes passing through the centres of the relative trays 30 mounted on the underlying platforms 13 and 12 respectively. A rotatable spindle 36 is supported by bearings in each bush 35, and carries a sprocket wheel 37 rigidly fixed to its top, a blade 38 being hinged to its lower end.

A chain 39 passes around the sprocket wheels 37 of all the spindles 36 mounted in a platform 13 and 14 respectively, and also passes round a sprocket wheel 40 carried by a vertical shaft 41 driven by a third electric motor $M_1$ fixed to the outside of the tubular structure 11. The motor $M_1$ simultaneously rotates all the spindles 36 and their blades 38 by way of the shaft 41 and chains 39.

As can be seen in FIG. 3, each of these blades 38 can be coupled to a U element 42 rigid with the shaft 43 of a stirrer (not shown but of known type) rotatably mounted in a lid 44 which can be fitted in known manner to a can 33.

Figure 4:
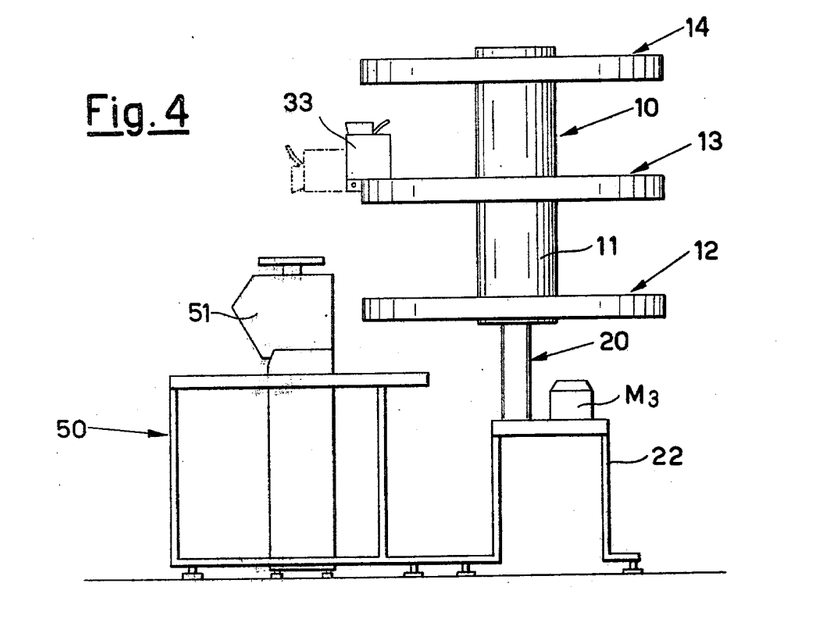
FIGS. 4 and 5 are a diagrammatic side and plan view respectively of the apparatus with its working station.
Figure 5:
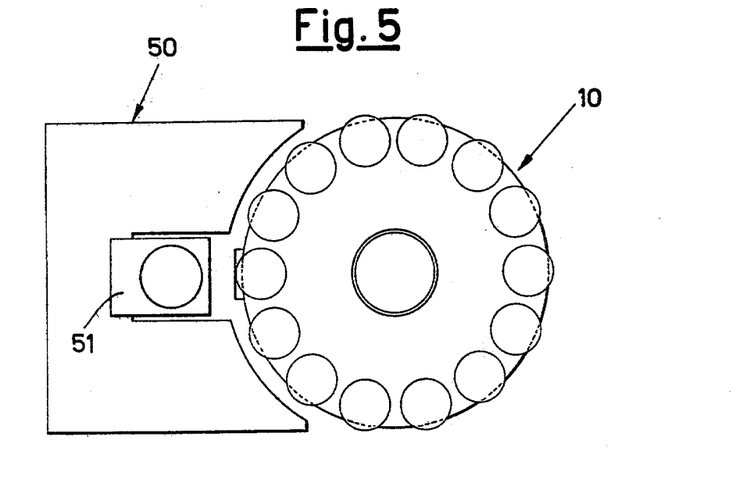

This lid 44 also comprises a delivery mouth 45 which can be closed by a lever flap 46. To the side of the described apparatus there is provided a working station, indicated overall by 50 in FIGS. 4 and 5, and comprising a balance 51. A container can be placed on the balance 51 to receive predetermined quantities (measurable by the balance) of different basic colours taken from the respective cans 33 disposed on the stand 10. By suitably operating the electric motors $M_2$ and $M_3$ from the working station, for example by pushbuttons, the required cans can be moved successively into a position above the balance 51, so that the operator has to do no more than tilt the respective positioned can and pour the required quantity of paint from it into the container placed on the balance.

In this case, the angle of rotation of the stand and its raising or lowering in order to move the required can into its pouring position over the balance, can be determined visually by the operator.

To further automate the operation, and to enable the procedure required for obtaining a mixture of basic colours according to any formulation to be programmed, the invention also comprises a programmable electronic control system which is described briefly hereinafter with reference to the block diagram of FIG. 6.

In this case, each can 33 containing a determined basic colour must be assigned a precise position on the rotatable and vertically movable stand, i.e. a determined tray 30, which can be recognised by means of a certain "address". This address is defined by a certain angular position of the stand 10 and by the shelf or platform on which the can is located.

In order to determine these positions or addresses, coded annular cams 52 are mounted inside the tubular structure 11 of the stand 10, to cooperate with microswitches 53 (mounted on the support 24) which indicate angular positions, and microswitches 54 are mounted on the central column of the lifting device 20 to indicate the position of the shelves.

In other words, a clear indication of a determined position of a can on the stand is given by the closure of one of the series of microswitches 53 and of one of the microswitches 54.

Figure 6:
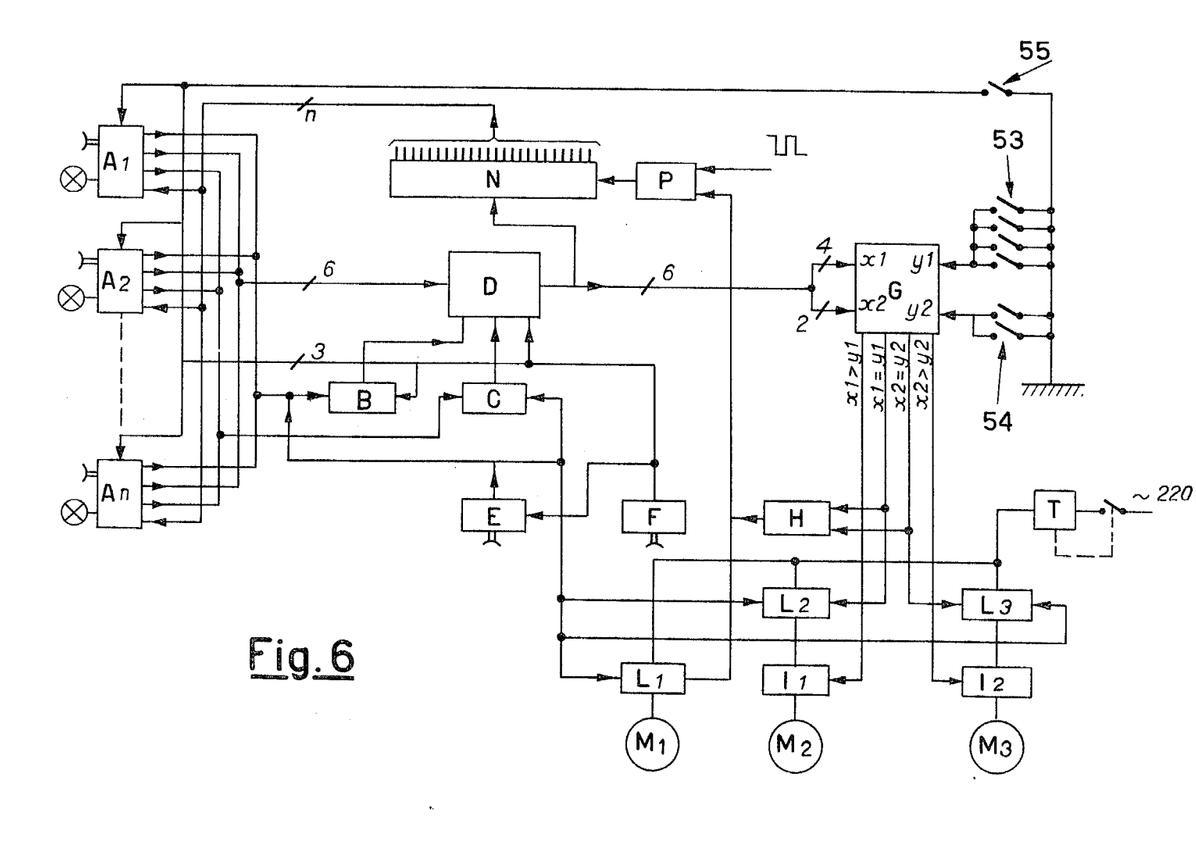
FIG. 6 is an overall block diagram, reduced to the essential components, of a possible electronic control system for the apparatus.

The programmable electronic control system of the diagram of FIG. 6 comprises substantially:
a basic colour selector logic circuit $A_1 \ldots A_n$ with its pushbuttons and indicator lamps;
a memory address counter B;
a write-read selector C;
memories with 6 addresses D;
a starting logic circuit E with its pushbutton;
a zeroing logic circuit F with its pushbutton;
a digital comparator G;
a mixer H;
reversing switches $I_1, I_2$;
motor switches $L_1, L_2, L_3$;
stirrer motor $M_1$;
rotation motor $M_2$;
lifting motor $M_3$;
a decoder 1/n N;
a blinking control P;
a timer T.

In basic terms, the logic operation is as follows.

For each can containing a basic colour located on the rotatable stand, there is provided a selection pushbutton with its indicator lamp (see basic colour selector logic circuit $A_1 \ldots A_n$) which lights when the pushbutton of the selected can is pushed.

Before selecting the cans containing the required basic colours, the pushbutton of the zeroing logic circuit F is pressed, to set all the circuits, cancel all existing memory contents and zero the memory address counter B.

The pushbuttons for the cans containing the basic colours required by the formulation are then pushed in the required sequence, and the relative indicator lamps then light to indicate permanently which basic colours have been selected, so providing a check for the operation.

When it is required to move one of the selected cans to the working station (weighing position), the pushbutton of the starting logic circuit E is pressed, which causes the stand 10 to rotate automatically in the right direction and to move vertically until the can is in its correct position. The stand then stops, and the relative indicator lamp begins to blink.

The paint can now be poured and weighed by inclining the can towards the balance pan. During this stage a switch 55 is operated to extinguish the indicator lamp of the can concerned.

The same operation is then repeated in sequence for the various selected cans. When all the indicator lamps have been extinguished, this indicates that all the selected basic colours have been used.

The stirrer motor $M_1$ stops when the required can is in the weighing position, and starts again when the pushbutton of the zeroing logic circuit F or the pushbutton of the starting logic circuit E is again pushed. After using the last selected can, the pushbutton of the zeroing logic circuit F is pushed to restart the stirrer motor $M_1$.

A description will now be given in greater detail of what happens when the various control pushbuttons are pressed.

In selecting the required basic colours, when the pushbutton of the can containing the first selected colour is pushed, the write-read selector C feeds the write signal to the memory D. This also comprises the programmer circuit which feeds the write pulse to the memory when the data, i.e. the address on the rotatable stand of the can containing the selected colour and the address of the memory supplied by the counter B are stable.

Each time a selection pushbutton is pressed, the counter B advances by one unit, and provides the memory D with the successive memory locations in which are stored the successive indications of the addresses on the rotatable stand of the cans containing the chosen basic colours.

To find the selected cans, the pushbutton of the starting logic circuit E is pressed. This logic circuit then starts the three motors $M_1$, $M_2$ and $M_3$ (stirrer, rotation and lifting).

When the starting logic circuit pushbutton is pressed in order to find the first required can, the write-read selector C feeds the read control to the memory D, and the memory address counter B is put initially at zero.

Each time the pushbutton of the starting logic E is pressed, the address of the required can on the rotatable stand appears at the inputs x1 and x2 of the digital comparator G, and the data concerning the shelf and angular position provided by the microswitches 54 and 53 are present at the inputs y1 and y2. The instantaneous difference between the inputs x and y of the digital comparator G gives rise to the required movements of the stand, as the outputs $x_1 > y_1$ and $x_2 > y_2$ of the digital comparator G are connected to the reversing switches $I_1$ and $I_2$ of the positioning motors $M_2$ and $M_3$.

Thus, if the requested address is that of a shelf above the one on which the can is located at the time of the request, the lifting motor $M_3$ rotates in such a manner as to lower the stand and move the required shelf to its correct position for subsequently pouring the paint. Having reached this position, the output $x_2 = y_2$ of the digital comparator G gives the stop signal, which acts on the switch $L_3$ of the lifting motor $M_3$.

The same stages take place in a like manner for the rotation of the stand into its correct position.

When both the outputs $x_1 = y_1$ and $x_2 = y_2$ of the digital comparator G indicate that the address on the stand has been reached, the mixer H allows application of the blinking signal to the decoder 1/n N by way of the control P. This decoder feeds the blinking signal to the indicator lamp of the selected can to indicate that it is in the weighing position.

When the can is tilted, the switch 55 acts in such a way that the blinking signal resets the memory D to zero, consequently extinguishing the indicator lamp of the can used.

The motor $M_1$ which drives the stirrers stops when the address of a requested can is reached, and restarts only when the pushbutton of the starting logic circuit E is again pressed. At the end of the search for all the selected cans, the pushbutton of the zeroing logic circuit F must be pushed in order to restart the motor $M_1$.

A timer T blocks the operation of the entire apparatus for a predetermined time interval as the apparatus is started, with the exception of the stirrer motor $M_1$ in order to obviate any insufficient mixing of the paints when they are poured.

The apparatus according to the invention has been described with reference to one possible embodiment, but this is not to be considered limiting. In this respect, numerous modifications can be made to the apparatus, both of structural character and with regard to the control devices, without leaving the scope of the present patent.

As stated, in its most simplified form, the apparatus can consist of a single rotatable platform supporting the cans, in which case the raising and lowering means would be superfluous, and in addition rotation can be carried out by hand instead of by special motor means.

I claim:

1. An apparatus for storing and stirring viscous liquids, particularly paints contained in cans of the type having stirrers rotatably supported in their lids, comprising
    a stand rotatably mounted on a vertical column and comprising a plurality of circular shelves arranged one above the other on said stand,
    a plurality of trays mounted on each of two of said shelves adjacent the periphery thereof for tilting movement about horizontal axes, and each tray being arranged to receive one of said cans,
    means for releasably securing said cans on said trays,
    a coupling member rotatably mounted above each tray and arranged to be releasably connected to the stirrer in the lid of the can disposed on the tray therebeneath, a first motor disposed on said stand and drivingly connected to each of said coupling members, a second motor for rotating the stand, the coupling members for driving the stirrers in the cans that are mounted on the trays on the lower of said two shelves being mounted in the base of the overlying shelf, and motor-driven lifting means for said stand for moving at least one of the shelves to a pre-determined height at choice.

2. An apparatus as claimed in claim 1, comprising electrical pushbutton means for controlling the motors for rotating and vertically moving the stand.

3. An apparatus as claimed in claim 2, wherein said pushbutton means form part of a programmable electronic control system which allows selection of a required number of cans for use in preparing a determined liquid mixture, said system including automatic search means for automatically positioning said stand to place a selected can on a selected one of said shelves in a predetermined fixed position.

* * * * *

UNITED STATES PATENT OFFICE
CERTIFICATE OF CORRECTION

Patent No. 4,299,500　　　　　　　　　Dated November 10, 1981

Inventor(s) Aldo Bassetti

It is certified that error appears in the above-identified patent and that said Letters Patent are hereby corrected as shown below:

On the title page, paragraph [73], that part of the Assignee's name reading "Elettronica" should be --Elettronici--.

Signed and Sealed this

Eighth Day of June 1982

|SEAL|

Attest:

Attesting Officer

GERALD J. MOSSINGHOFF
Commissioner of Patents and Trademarks